(12) United States Patent  (10) Patent No.: US 8,414,369 B2
Chiu et al.  (45) Date of Patent: Apr. 9, 2013

(54) MUSIC GAME SYSTEM AND METHOD OF PROVIDING SAME

(75) Inventors: Bernard Chiu, Boston, MA (US); Mark Izen, Chestnut Hill, MA (US); Matthew Sughrue, Hopedale, MA (US); Jack Davis, Boston, MA (US); Mikhail Chekmarev, Arlington, MA (US); Mashi Hasu, Framingham, MA (US); Leonard Eusebi, Newton Center, MA (US)

(73) Assignee: 745 LLC, Boston, MA (US)

( * ) Notice: Subject to any disclaimer, the term of this patent is extended or adjusted under 35 U.S.C. 154(b) by 214 days.

(21) Appl. No.: 12/579,360

(22) Filed: Oct. 14, 2009

(65) Prior Publication Data

US 2011/0086705 A1  Apr. 14, 2011

(51) Int. Cl.
*A63F 13/00* (2006.01)
(52) U.S. Cl. .............................. 463/7; 463/31
(58) Field of Classification Search ................ 463/7, 30, 463/33, 37, 31
See application file for complete search history.

(56) References Cited

U.S. PATENT DOCUMENTS

| | | | |
|---|---|---|---|
| 6,390,923 B1* | 5/2002 | Yoshitomi et al. | 463/43 |
| 7,320,643 B1* | 1/2008 | Brosius et al. | 463/37 |
| 7,772,476 B2* | 8/2010 | Lemons | 84/470 R |
| 7,777,117 B2* | 8/2010 | Salter | 84/477 R |
| 7,842,875 B2* | 11/2010 | Villa et al. | 84/609 |
| 7,851,689 B2* | 12/2010 | Reynolds et al. | 84/610 |
| 2007/0163427 A1* | 7/2007 | Rigopulos et al. | 84/609 |
| 2011/0009191 A1* | 1/2011 | Naidenov | 463/35 |

* cited by examiner

*Primary Examiner* — James S McClellan
(74) *Attorney, Agent, or Firm* — Alex Behrakis

(57) ABSTRACT

A music game method includes retrieving song data having note information from a storage medium coupled to a computer system. The method also includes determining from the song data at least two note indicators to be presented sequentially and determining from the song data a leader between first and second note indicators. The leader provides information related to the second note indicator. A music game system includes a song manager module configured to retrieve song data having note information from a storage medium, and a user interface module configured to determine from the song data at least two note indicators to be presented sequentially and to determine from the song data a leader between first and second note indicators. Each note indicator is related to corresponding note information. The first and second note indicators are adjacent to one another.

38 Claims, 16 Drawing Sheets

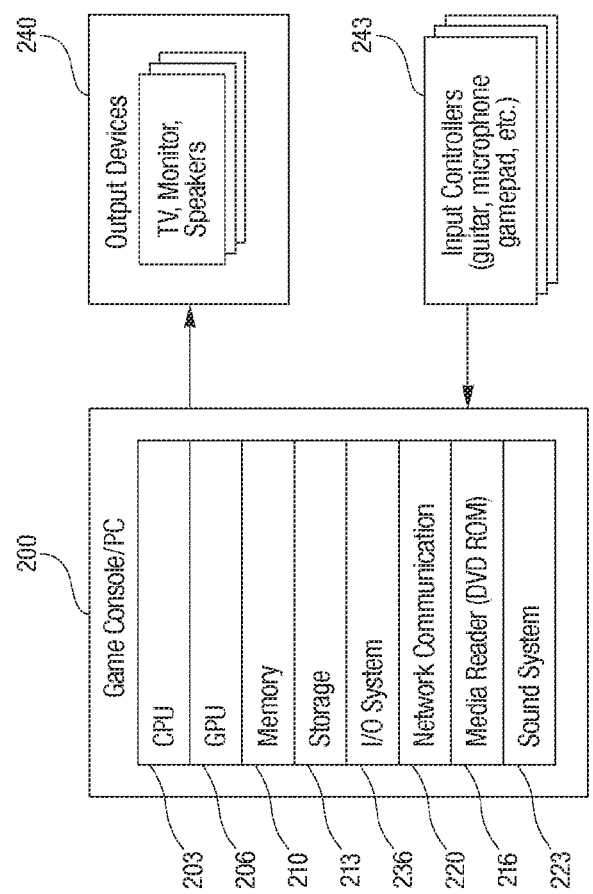

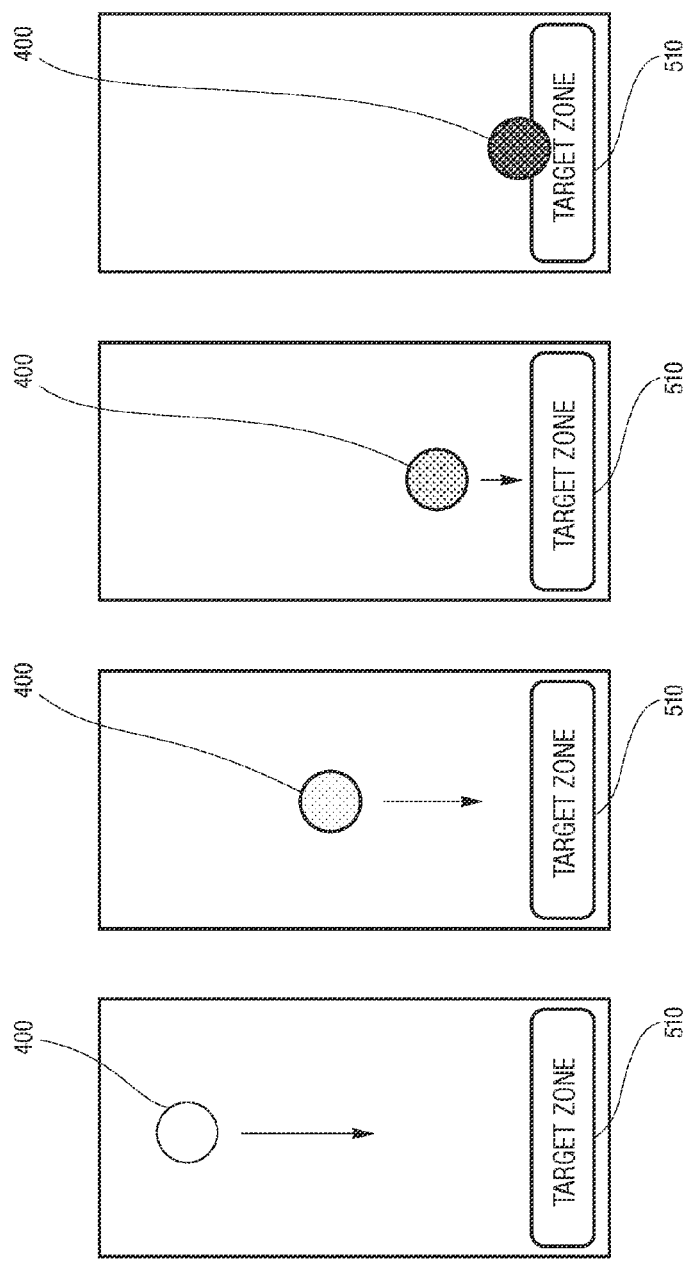

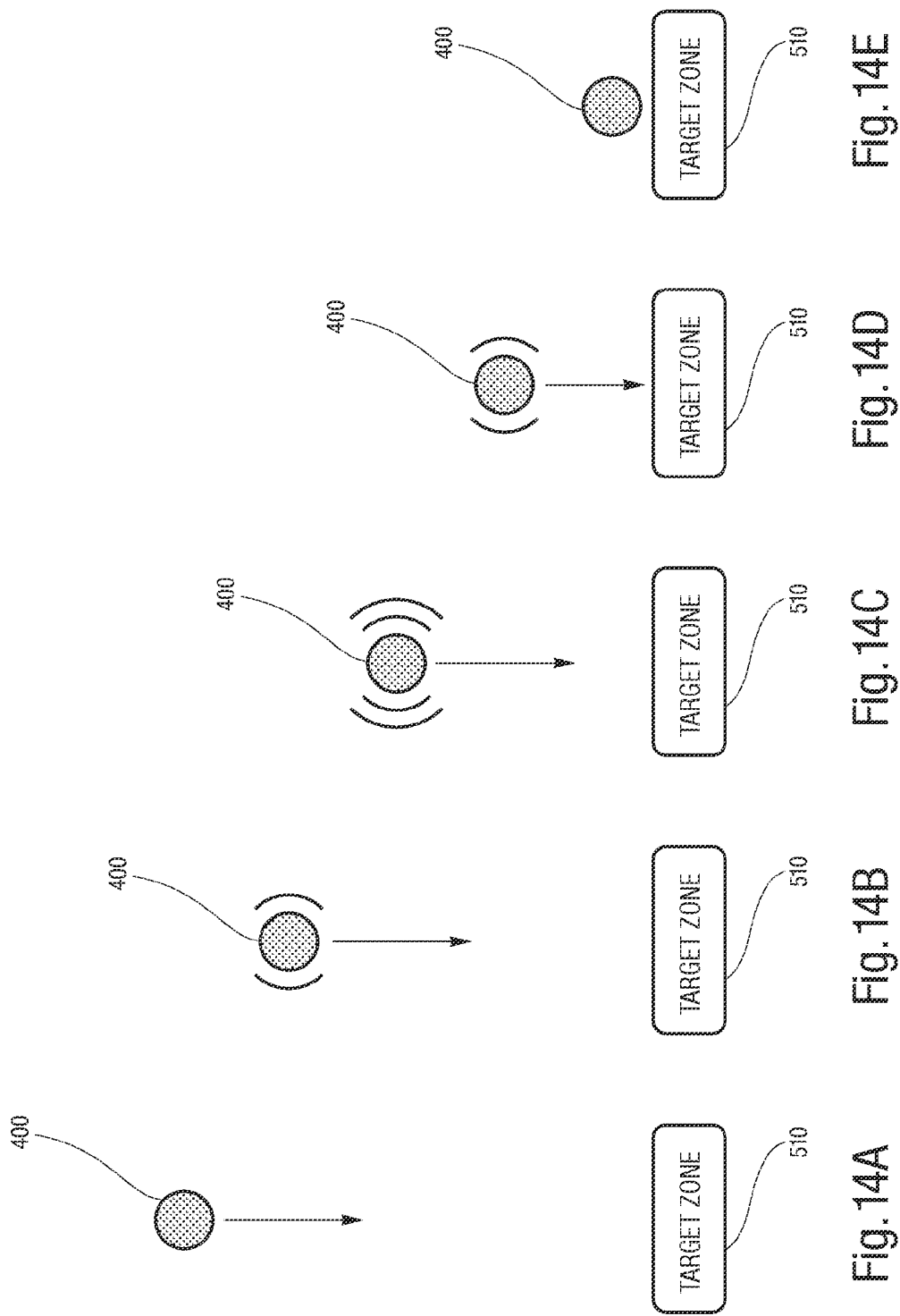

MUSIC GAME SYSTEM AND METHOD OF PROVIDING SAME

FIELD OF THE INVENTION

The present invention generally relates to music game systems using a computer system.

BACKGROUND OF THE INVENTION

Music games, such as the Guitar Hero games, employ controllers (which are typically coupled to video game consoles, such as the Sony PlayStation 3 game console or the Microsoft Xbox 360 game console, running suitable software to establish the game) by which users simulate playing musical instruments, such as by pressing buttons on the necks of guitars and strumming real or simulated strings, in response to instructions or cues presented on display screens coupled to the game consoles. In an exemplary such game, a series of icons, each corresponding to one of the buttons, is shown on the display screen as music is played. The icons travel down the display screen, and a player attempts to press the buttons, and to strum, when the corresponding icons pass a marked area on the display screen. The user is awarded points based on accuracy (e.g., whether the user activated the correct button) and timing (e.g., whether the user activated the button and strummed at the time the icon passed the marked area, within a predetermined error window) of the user's actions.

One such game is described in U.S. Pat. No. 6,390,923 to Yoshitomi et al., which is hereby incorporated herein by reference. In Yoshitomi's game, each musical instrument's instruction area on the display screen includes a set of long vertical tracks. Note bars move down the respective tracks, and the user is to operate the controller whenever a note bar passes a reference line on the screen. However, when the screen displays several note bars distributed among several of the tracks, especially when the tracks containing note bars are not adjacent each other, it may be difficult for the user to identify the time order in which the note bars should be acted upon. That is, the user may have difficulty resolving the vertical order of the horizontally spaced-apart note bars. Furthermore, none of the note bars provides a cue to the user to indicate which note bar should be acted upon next in time.

SUMMARY OF THE INVENTION

In accordance with one embodiment of the invention, a computer readable storage medium encoded with instructions is provided. The instructions cause display of a moving series of sequential note indicators associated with a performance of a musical work, and cause display of a moving leader disposed between a first and second note indicator of the series. The leader provides information related to the second note indicator. The instructions may establish a music game when loaded into memory of a video game console. The console may have at least one controller input, a video output for driving a display, an audio output and memory. Such instructions may be pertinent to a stored, digital representation of the performance, the representation including control signals. In related embodiments, the instructions may cause each note indicator to inform a player to provide an input when the note indicator passes a predetermined location.

In accordance with another embodiment of the invention, a method of providing a music game using a computer system includes retrieving song data having note information from a storage medium coupled to the computer system. The method also includes determining from the song data at least two note indicators to be presented sequentially, and determining from the song data a leader between first and second note indicators. Each note indicator is related to corresponding note information. The first and second note indicators are adjacent to one another. The leader provides information related to the second note indicator. The method also causes display of the at least two note indicators and the leader between the first and second note indicators.

In related embodiments, the leader may include one or more strands between the first and second note indicators. At least one of the one or more strands may be displayed as a continuous strand or a series of non-continuous strands. The song data may include tempo information, and the leader may provide visual information related to the tempo information using the one or more strands. The at least one note indicator may be related to fret selection on a guitar game controller. The at least one note indicator may be related to pitch in a song. The at least two note indicators may be color coded and the leader information may be color to match the color code of the second note indicator. The method may further include comparing a user input to at least one note indicator when the at least one note indicator passes a predetermined location, and determining a score based on a difference between the user input and the at least one note indicator using the computer system. In the method, comparing may include comparing a time the user input was received to an expected time, and determining a score based on a difference may include a time difference between the user input received and the expected time. The song data may include note information for two or more different types of musical instruments. The method may further include determining from the song data at least one additional note indicator to be presented concurrently with the second note indicator. The leader may include two or more strands between the first and second note indicators where one strand provides information related to the second note indicator and another strand provides information related to the at least one additional note indicator.

In accordance with another embodiment of the invention, a music game system includes a song manager module configured to retrieve song data having note information from a storage medium, and a user interface module, operatively coupled to the song manager module, configured to determine from the song data at least two note indicators to be presented sequentially and to determine from the song data a leader between first and second note indicators. Each note indicator is related to corresponding note information. The leader provides information related to the second note indicator.

In related embodiments, the music game system may further include a display device that displays the at least two note indicators and the leader indicator. The music game system may further include a matching module configured to compare a user input to at least one note indicator when the at least one note indicator passes a predetermined location, and a user performance module, operatively coupled to the matching module, configured to determine a score based on a difference between the user input and the at least one note indicator.

Illustrative embodiments of the invention may be implemented as a computer program product having a computer usable medium with computer readable program code thereon. The computer readable code may be read and utilized by a computer system in accordance with conventional processes.

BRIEF DESCRIPTION OF THE DRAWINGS

The foregoing features of the invention will be more readily understood by reference to the following detailed description, taken with reference to the accompanying drawings, in which:

FIG. 2 is a schematic block diagram of a game console, output devices and input controllers that may be used with a music game system according to embodiments of the present invention

FIGS. 13*a-d* show a note indicator changing over time according to embodiments of the present invention; and FIGS. 14*a-e* show a note indicator changing over time in synchrony with a tempo of a song according to embodiments of the present invention.

DESCRIPTION OF ILLUSTRATIVE EMBODIMENTS

Figure 1:
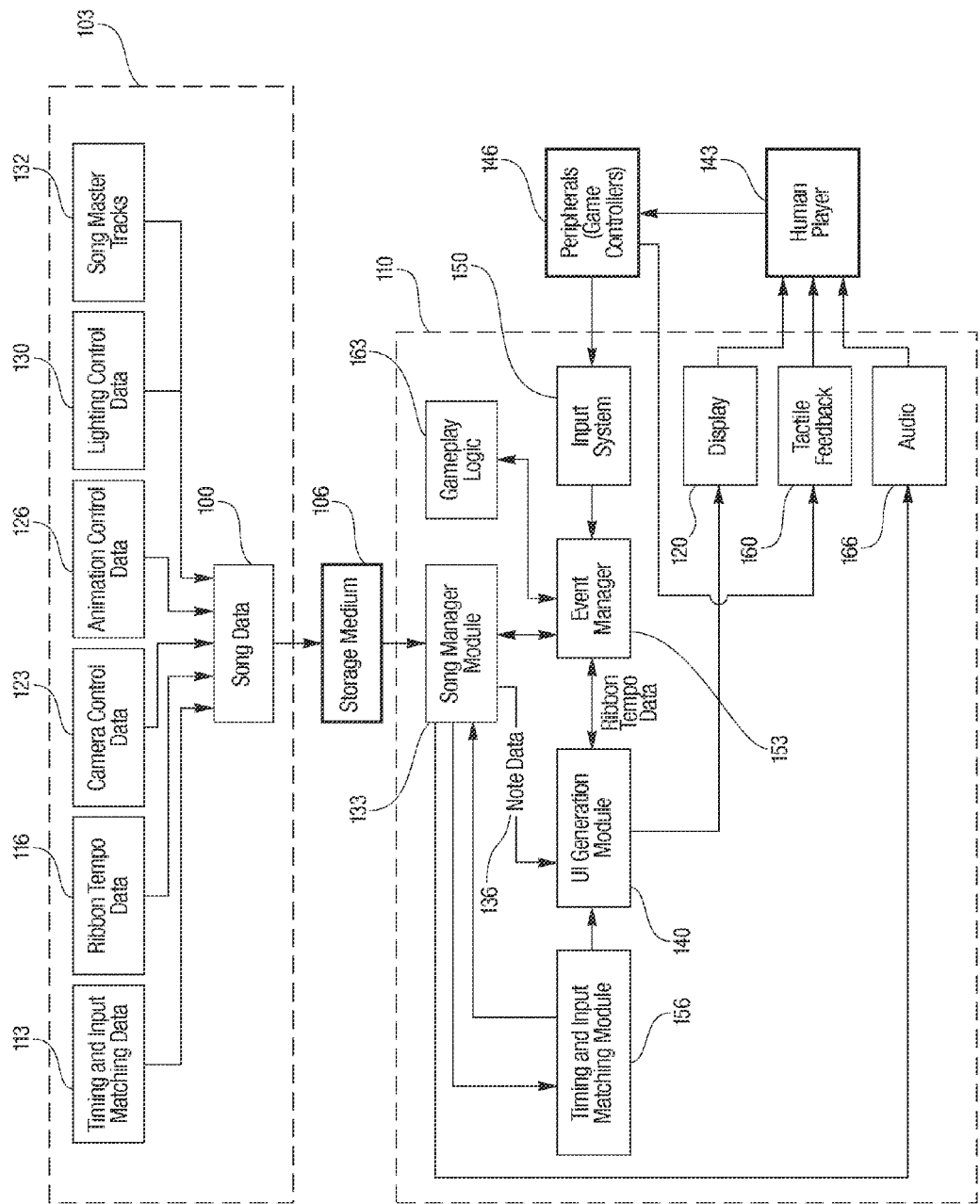
FIG. 1 is a schematic block diagram of a context in which a music game system may be used according to embodiments of the present invention.

Definitions. As used in this description and the accompanying claims, the following terms shall have the meanings indicated, unless the context otherwise requires:

A "leader", display of which is caused by a game console executing instructions in accordance with embodiments of the present invention, is a series of one or more moving strands, used to link a first note indicator with a second note indicator (the note indicators being in a series of note indicators pertinent to a musical work) and to provide advance information about the second note indicator. The link need not physically touch successive note indicators, nor need it be continuous. The leader simply needs to occupy space between the first and second note indicators so as to provide advance information about the second note indicator. Optionally, a leader may provide further information, such as about tempo.

Various embodiments of the present invention provide a music game system and method of providing same. The music game system includes a song manager module configured to retrieve song data having note information from a storage medium, and a user interface module configured to determine from the song data at least two note indicators to be presented sequentially and to determine from the song data a leader between first and second note indicators. Each note indicator is related to corresponding note information. The leader provides information related to the next, upcoming note indicator in a series of note indicators.

Embodiments of the present invention may be used with controllers, such as game controllers, by which one or more users ("players") may provide inputs to the music game system (also referred to as a "game console") and, optionally, by which the music game system may provide outputs, such as cues, to the users. In some embodiments, the music game provides instructions to one or more players via a visual display. The instructions indicate to each player when to operate a portion of the player's controller and which portion of the controller to operate, such as when to press a guitar string against a fret or when to strum a string. The game system may award points to the player if the player operates the specified portion of the controller, at the specified time, within a predetermined tolerance window.

Any controller or set of controllers that provide suitable input signals to the music game system and, if necessary, that process output signals from the music game system may be used. A single controller may be used if, for example, a single player interacts with the music game or if the controller supports multiple players. Optionally or alternatively, two or more identical or non-identical controllers may be used simultaneously or alternatingly by a single player. Similarly, two or more identical or non-identical controllers may be used simultaneously or alternatingly by multiple players. The controllers may, but need not, be configured to resemble musical instruments. For example, a controller may be configured to resemble a guitar, a drum set, a microphone, etc. Several suitable controllers are described in U.S. Patent Application Publication Nos. US 2009/0191932 and US 2009/0188371, each titled "Methods and Apparatus for Stringed Controllers and/or Instruments," the entire contents of each of which is hereby incorporated by reference.

As noted, a controller should provide a suitable input signal to the music game system. For example, a controller used by a player who is simulating playing a guitar in a game should provide selection information and timing information. For example, the selection information may provide information about which string or strings have been pressed against which fret or frets by the player. Some guitar-like controllers have electric buttons or other sensors on their necks for generating the selection information, instead of strings and/or frets. Thus, the selection information may be generated using any suitable hardware and/or software. A controller used by a player who is simulating playing a guitar in a game should also provide timing information. The timing information may provide information about when the strings have been strummed and/or which string(s) has been plucked, strummed, etc.

A controller used by a player who is simulating playing a drum set in a game may provide information about which drum, cymbal, cow bell, etc. is struck, which pedal is depressed, etc., including information about the timing of the strike, depression, etc. Some controllers simulate instruments, e.g., a set of drums may be simulated by a user striking a surface of a game controller pad. Other controllers may supply an input in other ways.

The signals from the controller may be sent to the music game system via any suitable medium, such as via a wired or wireless connection. Exemplary suitable connections include universal serial bus (USB), Bluetooth, Ethernet, infrared data transfer (such as according to the Infrared Data Association standard commonly referred to as IrDA) and musical instrument digital interface (MIDI). Details of illustrative embodiments are discussed below.

FIG. 1 is a schematic block diagram of a context in which a music game system may be used, according to some embodiments of the present invention. Song data 100 are generated by a suitable authoring system 103 and stored on a suitable non-volatile digital storage medium 106, such as a memory cartridge (read-only memory (ROM), flash memory, etc.), compact disc read-only memory (CD-ROM), digital video disc (DVD), Blu-ray disc (BD), hard disk, etc. The physical storage medium 106 may be distributed to users, and the users may install the physical storage medium 106 into a music game system 110 to make the song data stored thereon available to the music game system 110. Optionally or alternatively, the song data may be stored on a storage medium 106 connected to a server (not shown), and the game data stored on the storage medium may be downloaded from the server, such as via the Internet, to the music game system 110. It should be noted that, in some cases, some song data are made available to the music game system 110 via a physical storage medium that is installed in the music game system, and additional game data are downloaded from a server. For example, software that embodies game logic may be provided to the music game system via the physical storage medium installed in the game system, and information about a given song (such as which guitar strings are to be fretted and when, for the song) may be downloaded from the server.

The song data 100 on the storage medium 106 include various categories of data that affect presentation of a performance of a musical work by the video game console 200 of FIG. 2 (described below) in the course of the game play. Thus, song data include, as a foundational matter, a digital representation of the performance, including audio data 132 such as song master tracks. In addition, timing and input matching data 113 may specify criteria for presentation of note indicators, leader coloring, and related features described below. Thus, for a guitar-based controller, these criteria may include information about which string(s) or fret(s) must be operated, and a timeframe within which they must be operated, in order to score points in the game. Another of the categories is leader tempo data 116, which provide visual indication of tempo as described below in connection with FIGS. 7A-7D. Yet another of the categories is camera control data 123 which controls the sequence of cameras to use, movement of a camera, camera parameters such as field of view, camera targeting, etc. A further one of the categories is animation control data 126, which controls the sequencing, timing and selection of character animation for onstage characters, props, crowd or any other entities both in the background or user interface. Finally, lighting control data 130 controls timing, targeting, color, shape of visual light effects in the scene.

Games may be played at various levels of difficulty. In some embodiments, difficulty may be increased by presenting instructions to the player at a higher rate.

As noted, the music game system 110 displays instructions to the player(s), such as on a visual display 120. The visual display 120 may be part of an integrated hardware platform, such as a personal computer or an arcade game, or the visual display 120 may be a separate component, such as a television screen. The music game system 110 may display additional contents on the visual display 120, e.g., contents in addition to the instructions. For example, the additional contents may include a live-action or an animated video sequence depicting game characters, such as musicians playing on a stage or exploring a maze. For example, the characters may be computer generated characters or avatars. The perspective from which the characters are viewed may change as the game progresses or in response to points being scored or points failing to be scored. In addition, the instructions may be displayed with embellishments not strictly required to convey the instructions. For example, the instructions for striking a drum may be displayed overlaid over an image of a drum set. During game play, however, the image of the musical instrument may disappear leaving only the instructions.

When a storage medium 106 is installed in a music game system 110, or song data are downloaded from a server, a song manager module 133 reads the song data and provides information to other modules of the music game system 110. The song manager module 133 may copy portions of the song data to the other modules, or the song manager module 133 may make the data available to the other modules, such as by storing the data in tables or other types of data structures that are accessible by the other modules. Not all data flows or all control flows are shown in FIG. 1, as would be appreciated by one of skill in the art.

Note data, characterizing note indicators described below, are provided to a user interface (UI) generation module 140. The UI generation module 140 generates images or portions of images to be displayed on the display 120 to provide instructions to the player, such as which string to press against a fret, which fret to use, when to strum, which button to press on a controller, when to press the button, etc. The instructions may, for example, be based on some or all of the notes or words of a song. Aspects of the displayed instructions are described in more detail below.

The UI generation module 140 also generates and updates other aspects of images displayed on the display 120. For example, if a game involves characters searching a maze or fighting other characters, the UI generation module 140 may use the data originally provided as the camera control data 123, the animation control data 126 and the lighting control data 130 to render computer-generated characters, objects (such as weapons) and surroundings (such as buildings, doors, rivers, sky, etc.).

One or more human players, exemplified by a player (user) 143, observe the display 120 and operate one or more peripherals, e.g., game controllers 146, such as one of the controllers described in the above-referenced published patent applications. Of course, a combination of controllers 146 may be used, depending, for example, on the combination of musical instruments represented in the game or depending on a player selection.

An input system module 150 receives signals, such as signals representing selection information and timing information, generated by each controller 146 in response to operations performed by the player 143, such as drum strikes, sounds sung into a microphone or strings strummed. As noted, the controller 146 may be coupled to the music game system 110, and in particular to the input system module 150, via any suitable interconnection channel or facility, such as USB, Bluetooth or infrared (IR).

The input system module 150 conveys information about player inputs (actions) to an event manager module 153. The event manager module 153 distributes or otherwise makes available information about the player inputs to other modules of the music game system 110.

A timing and input matching module 156 receives song data, as well as information about player inputs, and evaluates accuracy and timing of the player inputs, relative to instructions that have been displayed to the player. Accuracy here means how closely the player followed the instructions in terms of operating the specified control, such as striking a specified drumhead, pressing a specified button or pressing a specified string against a specified fret. Timing here means how closely the player performed the action to the specified time at which the action was to be performed. In other words, the timing and input matching module 156 determines if the player inputs match the song data, within the predetermined tolerance windows.

The timing and input matching module 156 may also control a tactile feedback module 160 to provide the player 143 with tactile cues to indicate which control (e.g., which string, fret, drumhead, etc.) on the controller 146 to operate and when to operate the control. The tactile feedback module 160 may be part of the integrated music game system 110, part of the controller 146, a device to be attached to the controller 146 or a device separate from the game system 110 and the controller 146. For example, the tactile feedback module 160 may be a vibrator or other device positioned adjacent or on or in a button of the controller 146.

The timing and input matching module 156 also accumulates performance statistics for each player and, optionally, collectively for each of one or more groups of players, as described in more detail below. In addition, the timing and input matching module 156 provides information about player performance, statistics, events, etc. to a player performance module 163.

The player performance module 163 evaluates player performance and allocates points to players and, optionally, to groups of players. The player performance module 163 may, for example, designate time periods or circumstances during or under which player-scored points are multiplied or "bonus" points are allocated, as described in more detail below. The player performance module 163 may also alter the difficulty level of a game, based on criteria, such as the number of times a player has played the game, the rate at which the player has accumulated points in previous games, player inputs, etc.

The song manager module 132 may also generate signals to an audio module 166 in response to player inputs via the controller 146. These sounds may correspond to sounds that would be generated by a virtual musical instrument, if the musical instrument had been operated in a manner identical or similar to the manner the player operated the controller 146. It should be noted that the virtual musical instrument may be different than the musical instrument represented by the controller 146. For example, a guitar-based controller may include strings and frets, and the strings may be strummed, or the controller may include a pick action detector and buttons, instead of strings and frets. However, the virtual musical instrument may be a flute, trombone or piano, and predefined actions taken on the controller may map into simulated actions on the virtual musical instrument. For example, each string of the guitar controller may correspond to a different note on the flute, or each string of the guitar controller may correspond to a different virtual instrument, and each fret may correspond to a different note on the collection of virtual instruments. The audio module 166 plays audio, such as through a loud speaker or headphones (not shown), to the player 143. The audio may be pre-recorded audio tracks stored along with the song data 100, or the audio may be synthesized audio. Optionally, or alternatively, the audio module 100 may generate MIDI signals for processing and playing by an external synthesizer (not shown).

The music game system 100, or portions thereof, may be implemented in hardware or software or a combination of hardware and software. FIG. 2 is a schematic block diagram of an embodiment of the music game system 100. A game console/PC (personal computer) 200 includes a processor (CPU) 203, a graphics processing unit (GPU) 206, memory 210, storage 213 and a media reader 216. The CPU 203 and the GPU 206 execute instructions stored in the memory 210 to perform the operations described above, with respect to FIG. 1, and below. Data, such as song data, may also be stored in the memory 210, and this data may be accessed by the CPU 203 and the GPU 206, such as under the control of the instructions. The media reader 216 may include a device, such as a DVD drive or a Blu-ray disc drive, suitable for reading the storage medium 106 (FIG. 1) on which song data is stored.

The game console/PC 200 also may include a network communication port, such as an Ethernet port, by which the game console/PC 200 may be connected (directly or indirectly, such as through a router or firewall) to the Internet or another local- or wide-area computer network (not shown).

A sound system 233 includes sound generation or synthesis components, as are well-known in the art, for generating or synthesizing sounds, as described above.

The game console/PC 200 may also include an I/O system 236, such as a hard disk drive, keyboard, mouse, printer port, and the like.

One or more output devices 240, such as a display monitor, television screen, speakers, etc., may be connected to the game console/PC 200. One or more controllers 243 may be connected to the game console/PC 200, as described above, to provide an input. The controllers may include one or more guitar controllers, one or more drum controllers, one or more microphone controllers, one or more gamepad controllers, etc.

The game console/PC 200 may be a purpose-built device, for example, a device designed specifically for game playing. Optionally, or alternatively, the game console/PC 200 may be a general purpose computer, such as a personal computer, suitably configured to support game play, that is, with a sufficiently fast processor and with sufficient memory.

Thus, the music game system 110 shown in FIG. 1 provides a video game console that includes at least one controller input, a video output for driving a display, an audio output and memory for storing instructions and data. The storage medium 106 (shown in FIG. 1) includes a computer readable storage medium that may be encoded with instructions. When the instructions are loaded into the memory of a video game console, such as the music game system 110, the instructions establish a music game. In operation, the instructions are pertinent to a stored, digital representation of a performance of musical work. The representation includes control signals, such as signals for generating images on the display and for generating sounds.

Figure 3B:
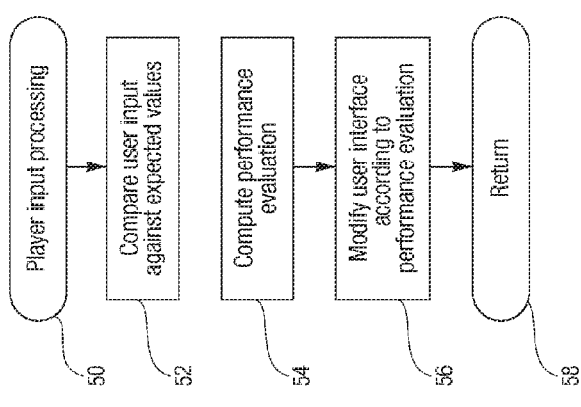
FIGS. 3, 3A and 3B show a process of providing a music game system according to embodiments of the present invention.
Figure 3A:
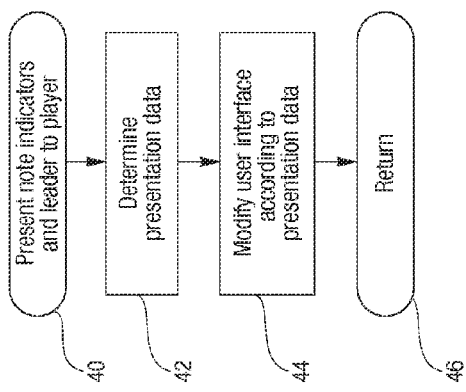
Figure 3:
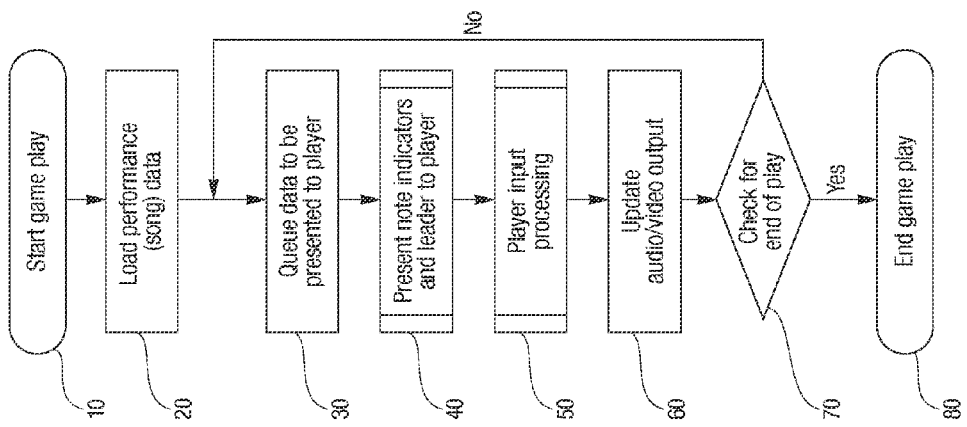

FIG. 3 shows a process of providing a music game that may be implemented using the music game system 110 according to embodiments of the present invention. The process begins at process 10, in which the music game starts. The one or more players may each select a game character, which may include male and female game characters. Each game character may have a special power, and the player may select the game character based on his or her particular aptitude. For example, one game character may have the special power or ability to multiply the score by a certain amount when the player's timing and selection response is perfect, which may be chosen by a player that has the ability to respond accurately a high percentage of time.

In process 20, song data 100, which may be stored in the storage medium 106, may be loaded into the song manager module 133. The song data 100 may include note, tempo, and rhythm information. In process 30, song data 100 to be presented may be placed in a queue. In process 40, at least two note indicators are presented sequentially to one or more players. A leader between adjacent note indicators is also presented. The leader may be displayed as one or more strands, although other shapes may also be used. Each strand may be a continuous strand or a series of non-continuous strands, e.g., such as a dotted line. The one or more strands may be contacting an adjacent note indicator or may be between two note indicators without contacting one or both adjacent note indicators. The note indicators are related to corresponding note information from the song data 100. The note indicators inform one or more players to input an appropriate response on the game controller 146 at a designated time. For example, in a music game that includes a guitar game controller, the note indicators may inform the one or more players to play different frets and strum strings on the guitar game controller. As another example, in a music game that includes karaoke with a microphone game controller, the note indicators may inform the one or more players to sing a certain pitch with designated words from a song.

Figure 4A:
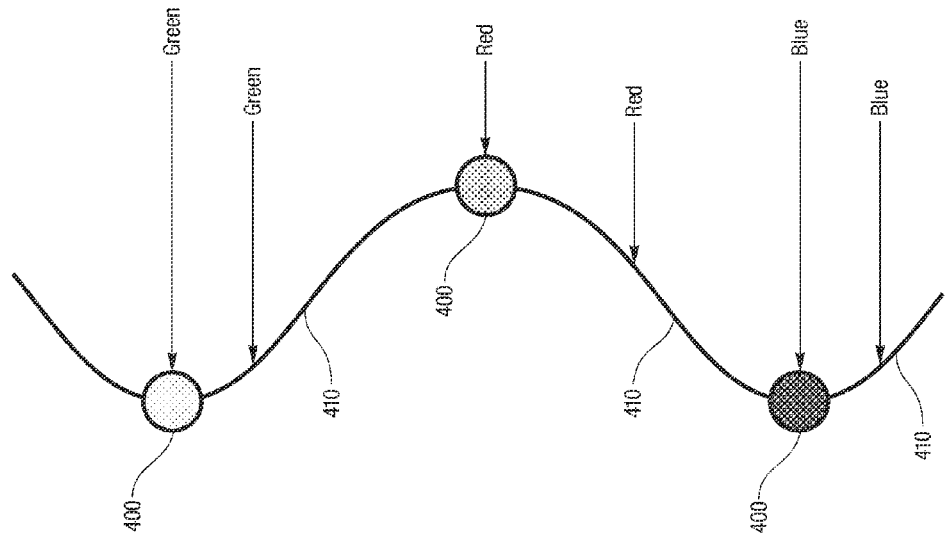
FIGS. 4A and 4B show a series of note indicators presented sequentially and corresponding leaders between the note indicators according to embodiments of the present invention.
Figure 4B:
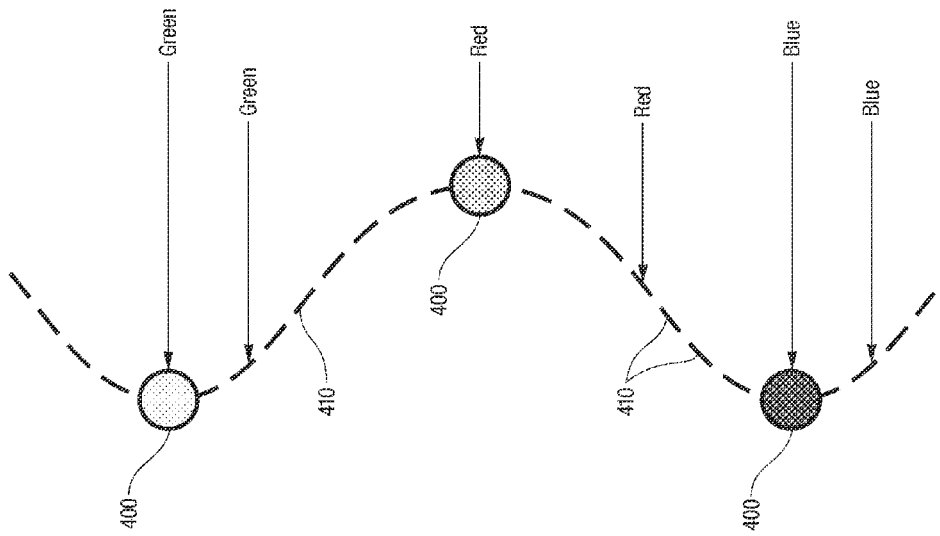

FIGS. 4A and 4B show an example of a series of note indicators 400 that are preceded by a corresponding leader 410. FIG. 4A shows several leaders 410 with each leader 410 displayed as a continuous strand connecting two adjacent note indicators 400. FIG. 4B shows several leaders 410 with each leader 410 displayed as a series of non-continuous strands between two adjacent note indicators 400. As shown, the leader 410 is between adjacent note indicators 400 and provides information related to the next, upcoming note indicator in the sequence. For example, a series of note indicators 400 may be shown and each one may have identifying indicia, e.g., color coding, such as shown in FIGS. 4A and 4B. In this example, the first note indicator is blue, the second note indicator is red and the third note indicator is green. The leader 410 between the first and second note indicators 400 is red to indicate that the second note indictor, which is the next, upcoming note indicator in the sequence, is red. Similarly, the leader 410 between the second and third note indicators 400 is green to indicate that the third note indictor, which is the next, upcoming note indicator in the sequence, is green. The various color coding of the note indicators 400 and leaders 410 may correspond to different selections on a game controller, such as different frets to be played on a guitar game controller. Although the leader 410 is shown as one strand, one or more strands may also be used, as discussed in more detail below. In addition, the leader 410 may be in a shape other than a strand. For example, the leader 410 may assume a series of shapes to convey information about the music or instructions for operation of one or more controllers.

As shown in FIG. 3A, the process 40 of presenting a series of note indicators 400 and corresponding leaders 410 includes determining presentation data in process 42. Determining presentation data includes determining the series of note indicators 400 to be sequentially presented and determining the corresponding leaders 410 between two adjacent note indications 400. The leader 410 contains information related to the next, upcoming note indicator 400 in the sequence. In process 44, a user interface is modified according to the series of note indicators 400 and corresponding leaders 410 that are presented.

Figure 5A:
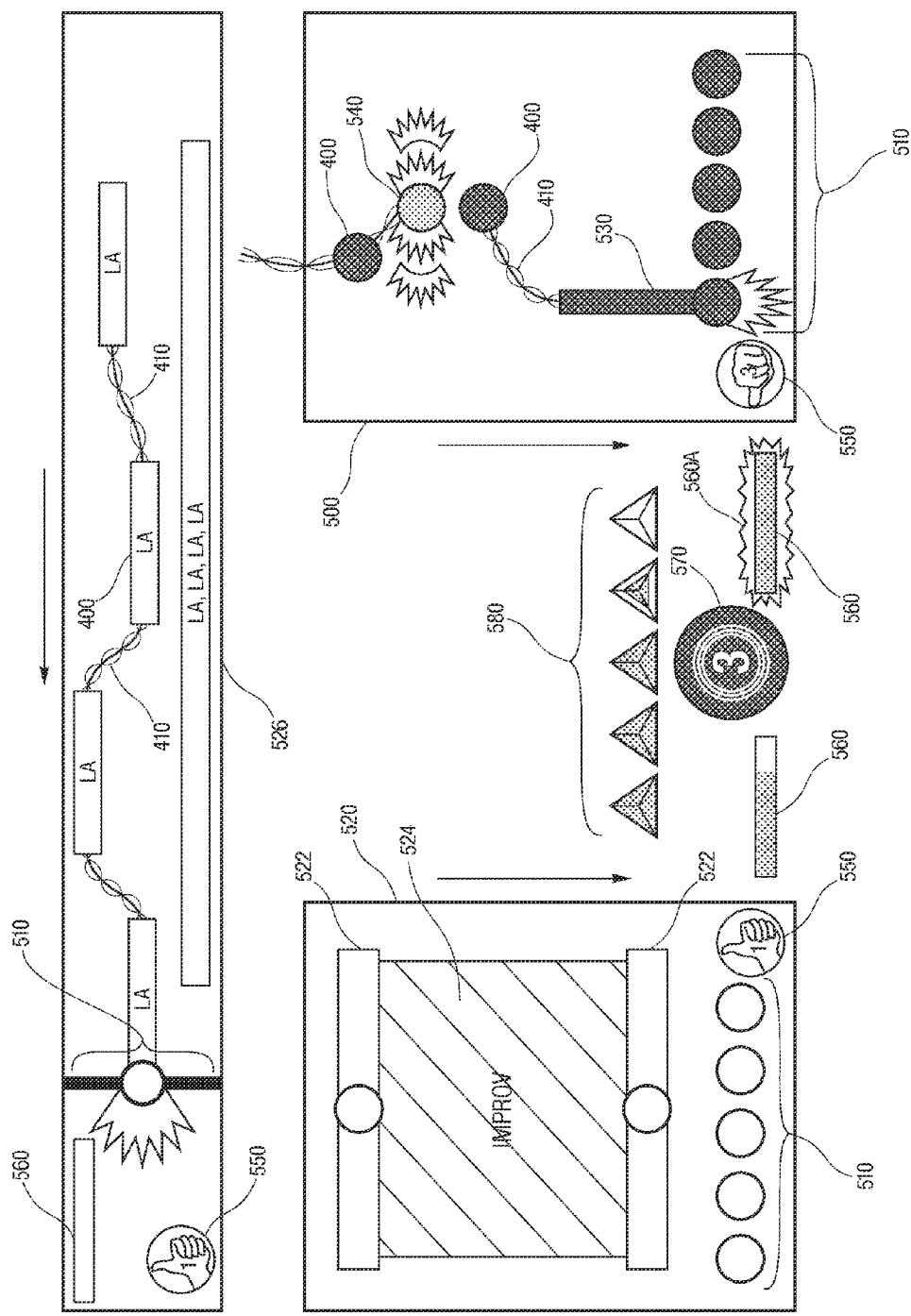
FIGS. 5A and 5B show an exemplary user interface according to embodiments of the present invention.
Figure 5B:
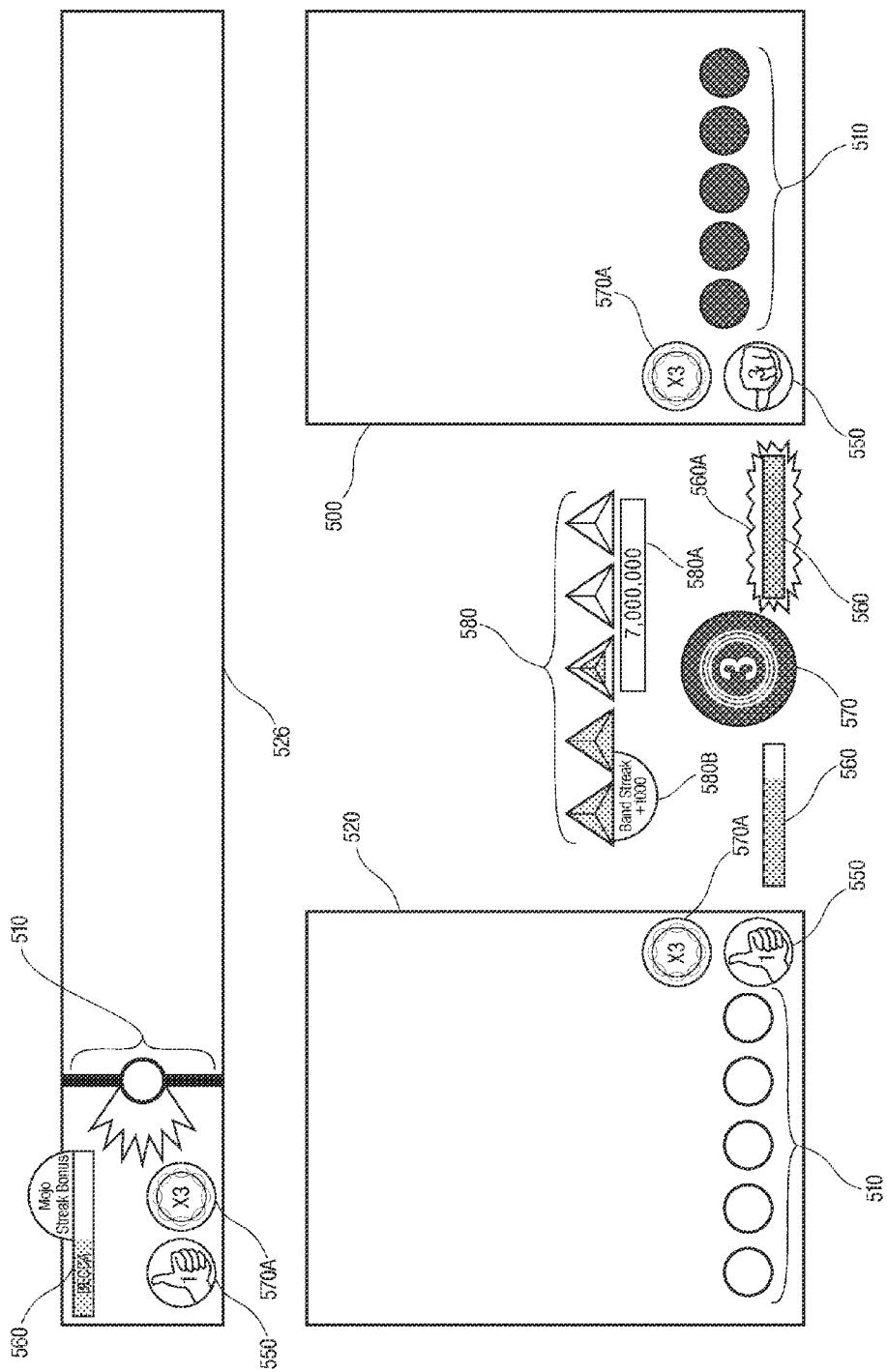

For example, FIGS. 5A and 5B show an example of a user interface that may be displayed using the music game system 110. The user interface may include one or more instrument display areas 500, 520, and 526 that are related to playing one or more types of music game controllers. For example, as shown in FIG. 5A, one area 500 may display information related to playing a guitar game controller. In this area 500, a series of note indicators 400 move from the top of the area 500 to bottom of the area 500 in the direction of the arrow. The note indicators 400 may correspond to five frets to be played on a guitar game controller. When one or more note indicators 400 reach a predetermined location, such as a play location 510, a player should respond to the game by providing an input related to the note indicator 400. For example, if the note indicator 400 corresponds to a first fret, then the player should select the first fret and strum the strings when the note indicator 400 passes the play location 510. In area 500, a note indicator 400 having a sustaining note bar 530 and an open strum note indicator 540 are shown, which are described in more detail below.

FIG. 5A also shows another area 520 that may display information related to playing a drum game controller. In this area 520, a series of note indicators 400 (shown as horizontal bars 522 in FIG. 5A) move from the top of the area 520 to the bottom of the area 520 in the direction of the arrow. The note indicators 400 may correspond to five percussion instruments to be played on the drum game controller. The five percussion instruments may represent instruments typically included in a drum set, such as toms, a snare drum, a bass drum, a hi-hat, and cymbal, etc. When one or more note indicators 400 reach the play location 510, a player should respond to the game by selecting the appropriate percussion instrument to strike. In area 520 of FIG. 5A, improvisation note indicators 522 with a connecting block 524 are shown, which are described in more detail below.

FIG. 5A also shows another area 526 that may display information related to matching the pitch on a song using a microphone game controller. In this area 526, a series of note indicators 400 move from right to left in the area 526 in the direction of the arrow. The note indicators 400 may include words and pitch of the song to be sung. When the note indicator 400 reaches the play location 510, a player should respond to the game by singing the words at the appropriate pitch when the note indicator 400 passes the play location 510.

Although the user interface in FIGS. 5A and 5B show three areas related to three different musical instruments to be played with the game, the user interface may use one or more areas related to one or more different musical instruments that may be shown to one or more players. Also, the note indicators 400 may use various shapes to depict the musical instrument that is being played in the game. For example, the note indicators 400 may be shaped as a guitar when a player is playing a guitar game controller. Similarly, the note indicators 400 may be shaped as a drum or cymbal when a player is playing a drum game controller and may be shaped as a musical note when a player is using a microphone game controller. Thus, the various note indicator 400 shapes shown in the figures are illustrative. The remaining elements shown in FIGS. 5A and 5B will be described in more detail below.

Figure 6:
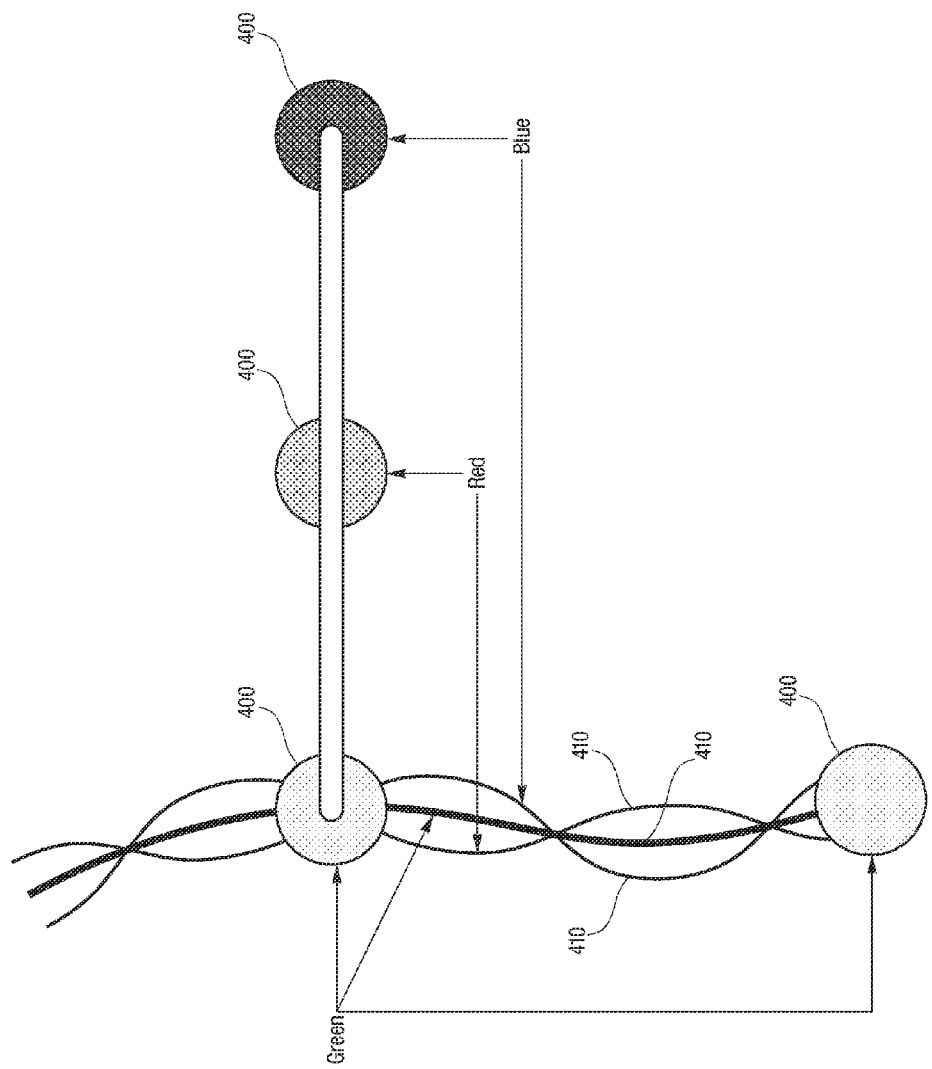
FIG. 6 shows a series of note indicators presented concurrently and a corresponding leader connected to one note indicator according to embodiments of the present invention.

Returning to FIG. 3A, in process 44, the user interface may be modified in a number of ways to display the note indicators 400 and the corresponding leaders 410 depending on the information to be conveyed by them. For example, FIG. 6 shows a series of note indicators 400 presented concurrently, and a corresponding leader 410 connected to one of the note indicators 400. This may inform one or more players to input an appropriate response on the game controller 146, such as when playing a chord or contacting two or more frets at one time on a guitar game controller. Although FIG. 6 shows three note indicators presented concurrently, two or more note indicators 400 may be used. In this embodiment, the leader 410 may include two or more strands, each strand displayed as a continuous strand (as shown) and/or a series of non-continuous strands (not shown). The two or more strands may provide information related to each note indicator 400 presented at the same time. For example, as shown in FIG. 6, three note indicators 400 may be presented at the same time, a green note indicator, a red note indicator, and a blue note indicator. In this example, the leader 410 between the first and second sequential green note indicators includes a green line, a red line and a blue line to indicate that the three note indicators 400, which are the next, upcoming note indicators in the sequence, are green, red and blue.

Figure 7:
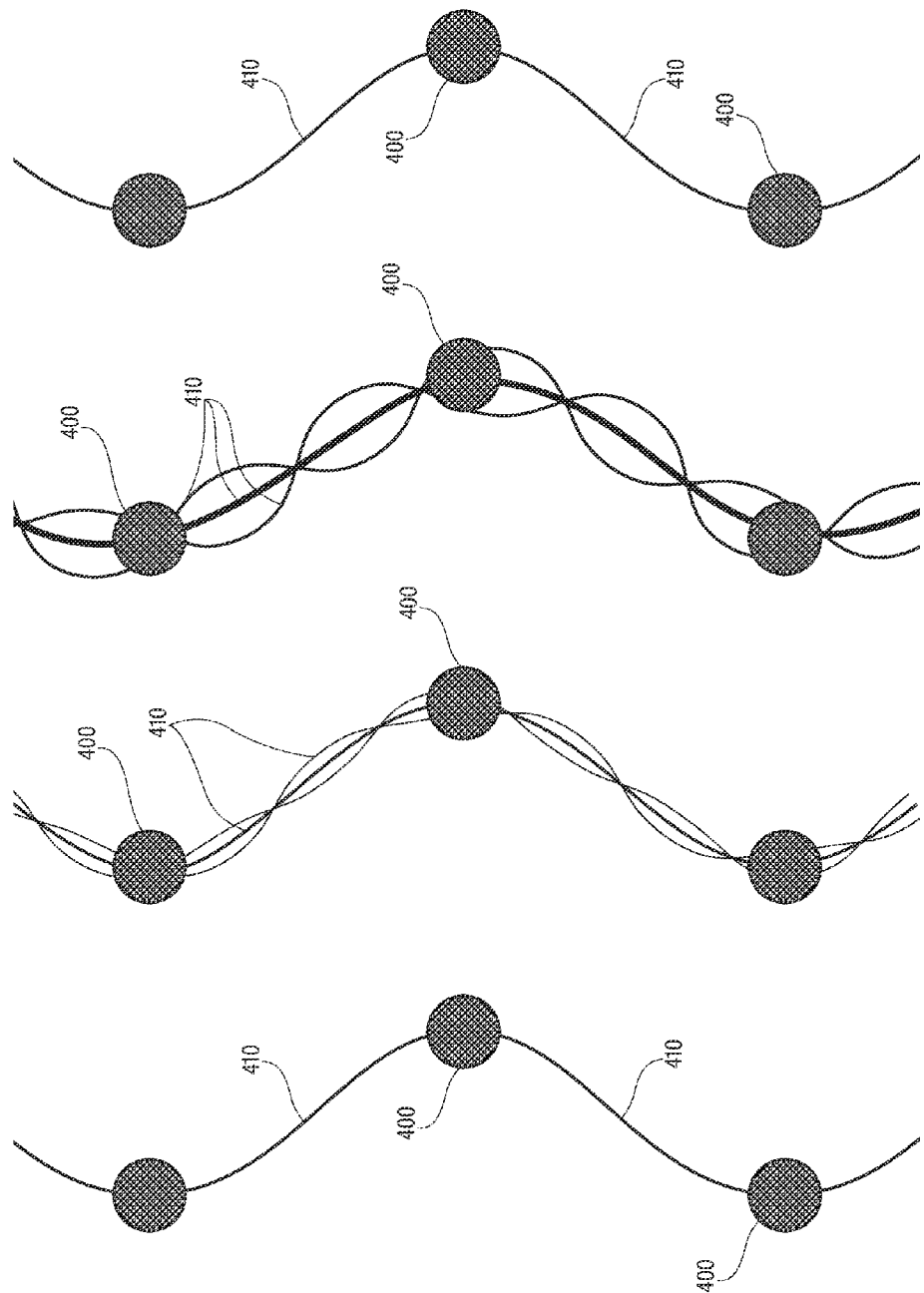
FIGS. 7A-7D show a leader changing over time in synchrony with a tempo of a song according to embodiments of the present invention.

FIGS. 7A-7D show another way in which the leader 410 may be modified in the user interface. In this embodiment, the leader 410 may include two or more strands and the song data 100 may include tempo information. One or more of the strands in the leader 410 may move over time in synchrony with the tempo of the song. FIGS. 7A-7D show a sequential presentation over time of note indicators 400 with connecting leaders 410 with FIG. 7A showing a first presentation of the leader 410 and FIG. 7D showing a last presentation of the leader 410. As shown, two strands of the leaders 410 may change in relation to one another and/or to a third strand.

Figure 8:
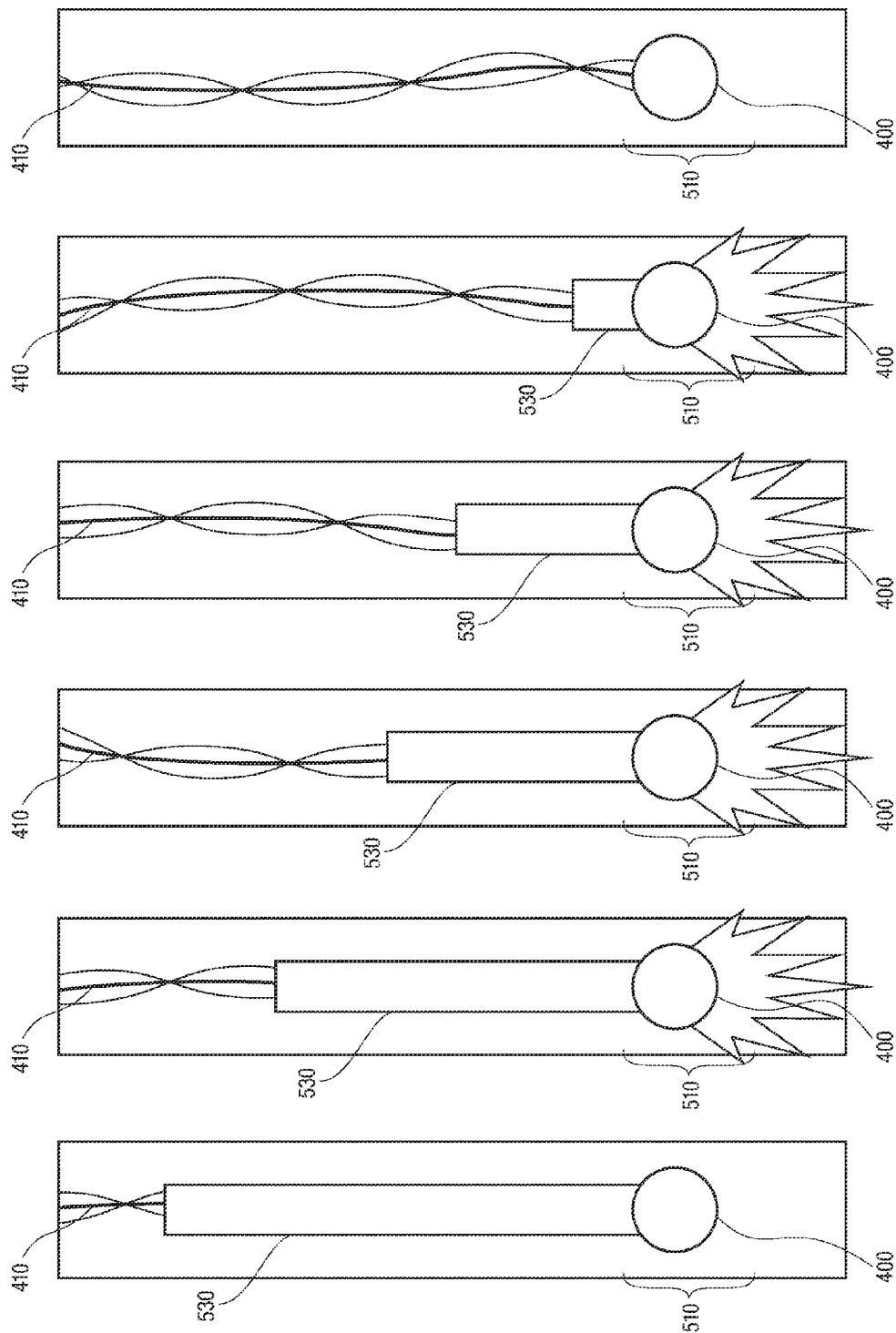
FIGS. 8A-8F show a leader changing over time with a sustaining note according to embodiments of the present invention.

FIGS. 8A-8F show another way in which the note indicators 400 and leaders 410 may be modified in the user interface. In this embodiment, the note indicator 400 includes a vertical bar 530 connected to the upper portion of the note indicator 400. The bar 530 may illustrate when a sustaining note is to be played on a game controller, e.g., a guitar game controller for one or more of the frets. FIGS. 8A-8F show a sequential presentation over time of a note indicator 400 having a sustaining note bar 530 with a connecting leader 410 as it moves toward the play location 510. In this example, the sustaining note should be held until the bar 530 passes the play location 510, as shown in FIG. 8F, at which time the leader 410 provides information related to the next, upcoming note indicator(s) 400.

Figure 9:
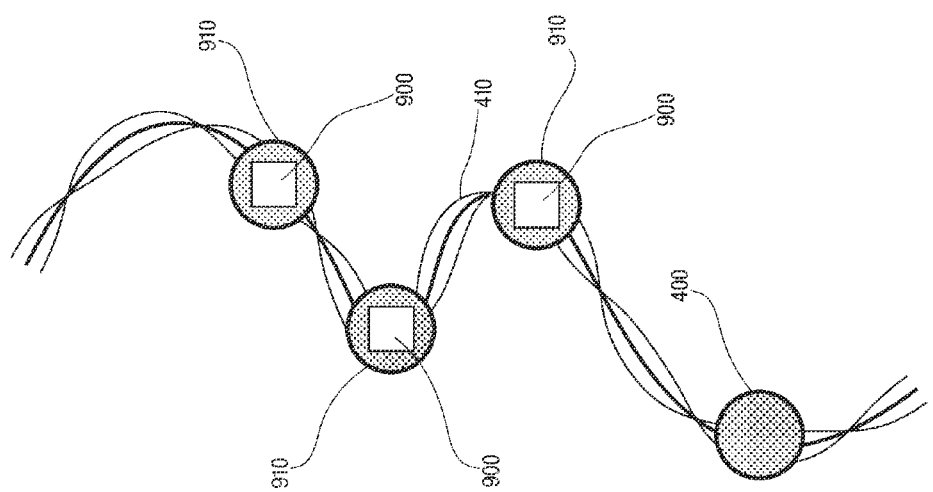
FIG. 9 shows a series of note indicators having additional information according to embodiments of the present invention.

Another way in which the note indicators 400 may be modified in the user interface is shown in FIG. 9. In this embodiment, the note indicators 400 may provide additional information within the note indicator 400 to one or more players related to playing the game controller 146. For example, one or more note indicators 400 may be presented with open squares 900, showing a "hammer-on, pull off" sequence of playing a guitar game controller. As known by those skilled in the art, hammer-on is when frets are contacted without strumming the strings. In this embodiment, the hammer-on note indicators 910 may inform one or more players to play one or more frets without strumming the strings or moving a strum bar on a guitar game controller.

Figure 10:
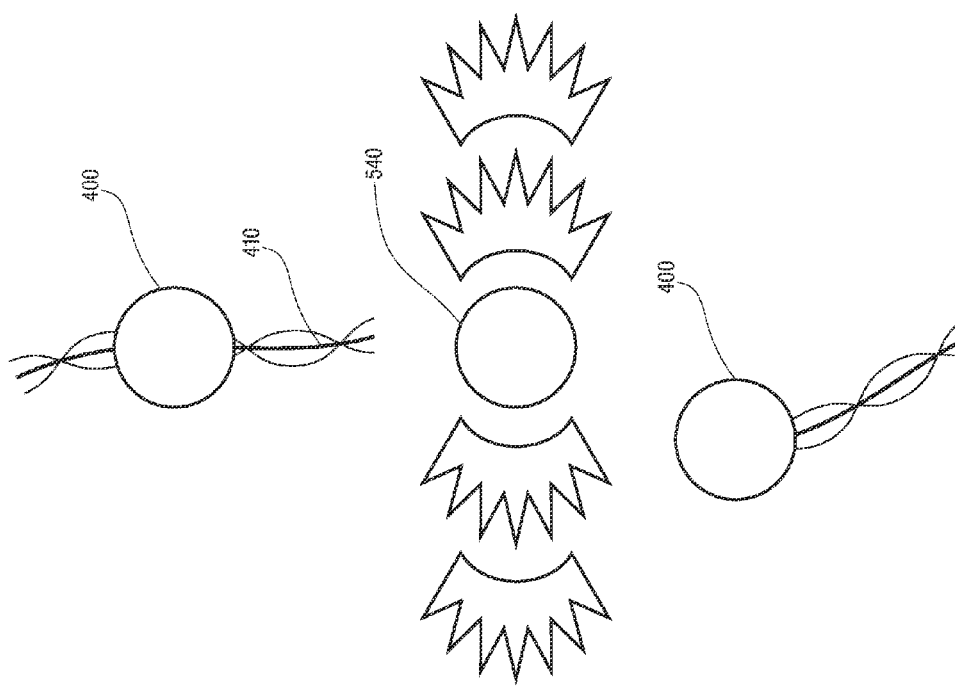
FIG. 10 shows a series of note indicators when an open strum is indicated according to embodiments of the present invention.

FIG. 10 shows another way in which the note indicators 400 and leaders 410 may be modified in the user interface. In this embodiment, one of the note indicators 540 may illustrate when an open strum is to be played on a guitar game controller. As known by those skilled in the art, an open strum is when the strings on a guitar are strummed without pressing any frets. In this embodiment, the open strum note indicator 540 may inform one or more players to strum the strings or move a strum bar on a guitar game controller without contacting one or more frets or one or more buttons. After the open strum note indicator 540 is shown, a leader 410 may be presented between the open strum note indicator 540 and the next, upcoming note indicator 400 in the series to inform one or more players of information related to the upcoming note indicator 400, such as shown in FIG. 10.

Figure 11:
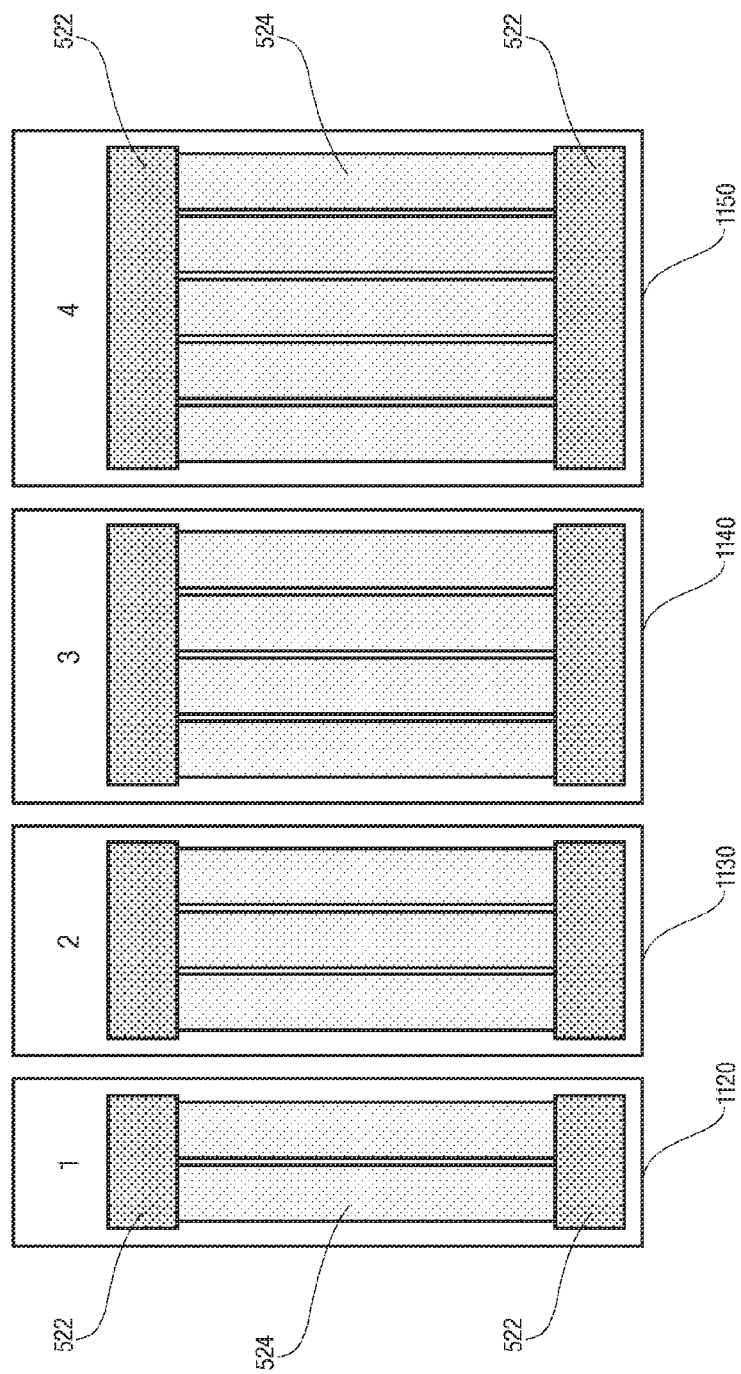
FIG. 11 shows various note indicators when improvisation is indicated according to embodiments of the present invention.

Another way in which the note indicators 400 may be modified in the user interface is shown in FIG. 11. In this embodiment, the note indicators 400 may be presented as a horizontal bar 522, or some other shape, with one or more vertical bars or a block area 524 between or connecting two horizontal note bars 522. This may illustrate when a player is to improvise on a game controller 146. As known by those skilled in the art, improvisation is when a musical instrument is played without following a set musical score. The musician composes the music as he or she plays. In this embodiment, the improvisation note indicators 522 may inform one or more players to play the game controllers without following any note indicators 400. For example, the one or more players may provide input with one or more frets, with or without strumming the strings or moving a strum bar, on a guitar game controller. Similarly, one or more players may provide input with one or more drum pads on a drum game controller. For example, in FIG. 11, area 1120 shows when two frets on a guitar game controller or two drum pads on a drum game controller may be used. Similarly, area 1130 shows when three frets or three drum pads may be used, area 1140 shows when four frets or four drum pads may be used and area 1150 shows when five frets or five drum pads may be used during the improvisation period. Once another horizontal bar 522 is presented after the vertical bars or block area 524, the improvisation period is over, and the one or more players are informed to provide an appropriate response based on the subsequent note indicators 400 presented.

FIG. 12 shows another way in which the note indicators 400 may be modified in the user interface. In this embodiment, the note indicators 400 may provide additional information within the note indicator 400 related to the timing of playing the note indicator 400. For example, the inner appearance of one or more note indicators 400 may change as the note indicator(s) 400 approach the play location 510. FIGS. 12a-12d show a sequential presentation over time of a note indicator 400 as it moves toward the play location 510. FIG. 12a shows a white interior when the note indicator 400 is first displayed or far away from the play location 510 and FIG. 12d shows a filled in grey interior when the note indicator 400 has reached the play location 510. As shown, the note indicator 400 may appear to be filling up or changing color over time as it approaches the play location 510.

Figure 12D:
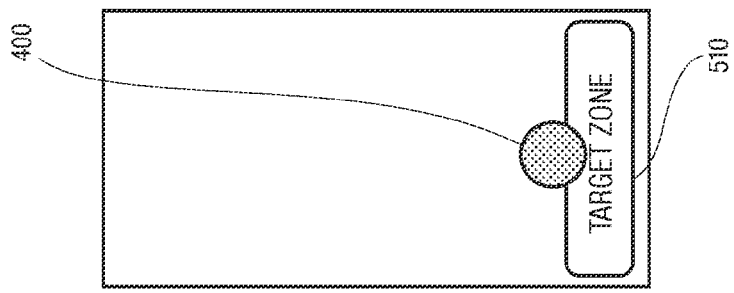
FIGS. 12*a-d* show a note indicator changing over time according to embodiments of the present invention.
Figure 12C:
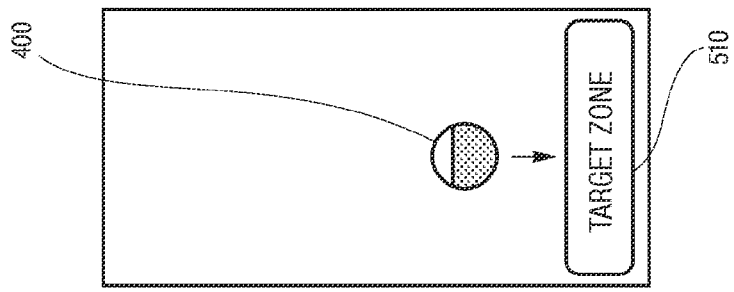
Figure 12B:
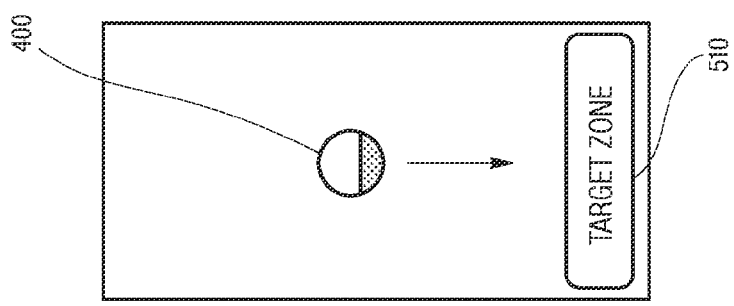
Figure 12A:
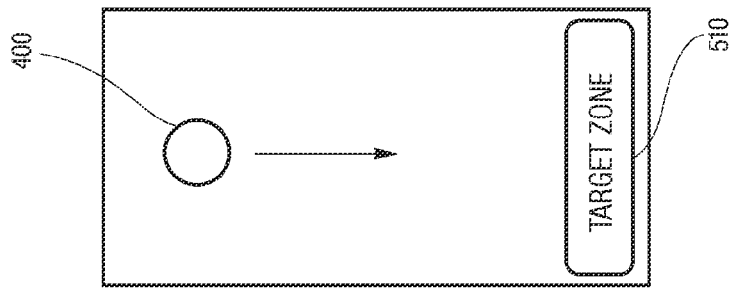

FIG. 13 shows another way in which the note indicators 400 may be modified in the user interface. In this embodiment, the note indicators 400 may provide additional information related to the timing of playing the note indicator 400. For example, the appearance of one or more note indicators 400 may change as the note indicator(s) 400 approach the play location 510. FIGS. 13a-13d show a sequential presentation over time of a note indicator 400 as it moves toward the play location 510. FIG. 13a shows a relatively transparent note indicator 400 when the note indicator 400 is first displayed or far away from the play location 510 and FIG. 12d shows a more solid note indicator 400 when the note indicator 400 has reached the play location 510.

Another way in which the note indicators 400 may be modified in the user interface is shown in FIG. 14. In this embodiment, the note indicators 400 may change shape or display, or include additional information related to tempo information. For example, the note indicators 400 may move or be modified over time in synchrony with the tempo of the song. FIGS. 14a-14e show a sequential presentation over time of a note indicator 400 with additional information as it moves toward the play location 510.

Referring again to FIG. 3A, after the user interface is modified according to the presentation data (e.g., the note indicators 400 and the leaders 410) to be presented in process 44, the process returns to FIG. 3 in process 46. Referring to FIG. 3, one or more player inputs may be processed in process 50. As shown in FIG. 3B, the process 50 of processing player inputs may include comparing a user input to expected values in process 52. For example, when using a guitar game controller, the note indicators 400 may inform the one or more players to play a certain fret and strum when one or more note indicators 400 pass the play location 510. The expected value may include selection information related to the input as well as timing information related to the timing of the input. For example, when using a guitar game controller, the expected value may include the correct fret information as well as the timing of when the fret and strings should be played within a designated timeframe or tolerance window.

In process 54, a performance evaluation may be computed for the one or more players based on a difference between the user inputs and the expected values as indicated by one or more note indicators 400. Thus, the performance evaluation computes the player's selection accuracy of matching the note indicators 400 as well as the timing accuracy of when the player should input the response. For example, in a guitar game controller, the performance evaluation may be based on whether the correct fret is played as well as whether the correct fret is played at the correct time. If there is a delay in the time when the user input was received compared to an expected time of when the input should be received, then the performance evaluation may appropriately reflect this discrepancy.

In process 56, a user interface may be modified according to the computed performance evaluation. For example, referring again to FIGS. 5A and 5B, an individual accuracy indicator 550 in each of the areas 500, 520, 526 may be displayed to inform the appropriate player of the selection and timing accuracy of that player's last input response. The individual accuracy indicator 550 may include several levels of feedback (e.g., excellent, good, fair and bad) and may be displayed with a visual and/or a numerical indicator that informs the player of the number of consecutive correct responses. For example, as shown in area 520 and area 526, a thumbs up may indicate an excellent match with the expected result, and the "1" may indicate that one correct response has been given in a row. As shown in area 500, a thumbs sideways may indicate a good or fair match, and the "3" may indicate that three correct responses have been given in a row. A thumbs down (not shown) may indicate a bad match with the expected result. Although "1" and "3" consecutive correct responses are shown, any number may be provided that represents the number of correct responses, within a tolerance window, that are given in a row.

Although the individual accuracy indicator 550 provides a player with feedback related to the player's latest input response, an overall accuracy indicator 560 may be displayed to inform the appropriate player of the selection and timing accuracy of the player's responses during the game. The overall accuracy indicator 560 may provide a meter showing the player's overall rating toward a goal. In addition, or alternatively, the overall accuracy indicator 560 may provide feedback in the form of a numerical score. Also, the overall accuracy indicator 560 may be displayed with the appropriate player's character and an indication of the player's streak, such as shown in area 526 of FIG. 5B. Once a certain goal or score is reached, such as shown in area 500 with accuracy indicator 560*a*, a player's score may be enhanced or multiplied by a given factor. A multiplier indicator 570 may be displayed for the band or a multiplier indicator 570*a* may be displayed for one or more of the players in each of the areas 500, 520, 526. When two or more players are playing the music game, a combined band score 580 may be displayed. As shown in FIG. 5B, the combined band score 580 may be displayed with a numerical score 580*a* and may include an indication of a band streak 580*b*.

Referring again to FIG. 3A, after the user interface is modified according to the performance evaluation in process 56, the process returns to FIG. 3 in process 58. Referring to FIG. 3, the audio and/or video outputs may be updated in process 60. For example, if a player accurately matches one or more note indicators 400, the music game system may play the corresponding note information related to the note indicators 400 or may provide other audio or visual feedback to the one or more players.

In process 70, the process checks to see if the end of the game has been reached. If not, the process returns to process 30, where additional song data 100 may be placed in a queue. If the end of the game has been reached, then the game ends in process 80.

A music game system has been described as including a processor controlled by instructions stored in a memory. The memory may be random access memory (RAM), read-only memory (ROM), flash memory or any other memory, or combination thereof, suitable for storing control software or other instructions and data. Some of the functions performed by the music game system have been described with reference to flowcharts and/or block diagrams. Those skilled in the art should readily appreciate that functions, operations, decisions, etc. of all or a portion of each block, or a combination of blocks, of the flowcharts or block diagrams, or of the modules described above, may be implemented as computer program instructions, software, hardware, firmware or combinations thereof. Those skilled in the art should also readily appreciate that instructions or programs defining the functions of embodiments of the present invention may be delivered to a processor in many forms, including, but not limited to, information permanently stored on non-writable storage media (e.g. read-only memory devices within a computer, such as ROM, or devices readable by a computer I/O attachment, such as CD-ROM, DVD disks or Blu-ray disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement embodiments of the invention may optionally, or alternatively, be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

While the invention is described through the above-described exemplary embodiments, it will be understood by those of ordinary skill in the art that modifications to, and variations of, the illustrated embodiments may be made without departing from the inventive concepts disclosed herein. For example, although some aspects of the music game system have been described with reference to a flowchart, those skilled in the art should readily appreciate that functions, operations, decisions, etc. of all or a portion of each block, or a combination of blocks, of the flowchart may be combined, separated into separate operations or performed in other orders. Furthermore, disclosed aspects, or portions of these aspects, may be combined in ways not listed above. Accordingly, the invention should not be viewed as being limited to the disclosed embodiment(s).

Among other implementations, the various modules discussed herein may be implemented as a single integrated unit having the discussed functionality, and/or a plurality of interconnected, separate functional devices. Reference to a "module" therefore is for convenience and not intended to limit its implementation. Moreover, the various functionalities within modules may be implemented in any number of ways, such as by means of one or more application specific integrated circuits or digital signal processors, or the discussed functionality may be implemented in firmware and/or software.

Embodiments may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions may embody all or part of the functionality previously described herein with respect to the method and system. Those skilled in the art should appreciate that such computer instructions may be written in a number of programming languages for use with many computer architectures or operating systems. For example, embodiments may be implemented in a procedural programming language (e.g., "C") or an object oriented programming language (e.g., "C++"). Alternative embodiments of the invention may be implemented as pre-programmed hardware elements, other related components, or as a combination of hardware and software components.

Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Thus, some embodiments of the invention may be implemented as hardware, software (e.g., a computer program product), or a combination of both software and hardware.

Although the above discussion discloses various exemplary embodiments of the invention, it should be apparent that those skilled in the art can make various modifications that will achieve some of the advantages of the invention without departing from the true scope of the invention.

What is claimed is:

1. A computer readable storage medium encoded with instructions, the instructions establishing a music game when loaded into memory of a video game console, the console having at least one controller input, a video output for driving a display, an audio output and memory, such instructions pertinent to a stored, digital representation of a performance of a musical work, the representation including control signals, wherein the instructions:
   cause display of a moving series of sequential note indicators associated with the performance; and
   cause display of a moving leader disposed between a first and second note indicator of the series, the leader providing information related to the second note indicator, wherein the first note indicator and second note indicator are color coded and the leader information includes color determined to match the color code of the second note indicator.

2. The computer readable storage medium of claim 1, wherein the instructions cause each note indicator to inform a player to provide an input when the note indicator passes a predetermined location.

3. A computer program product, for use on a computer system, for providing a music game, the computer program product comprising a computer usable medium having computer readable program code thereon, the computer readable program code comprising:
   program code for retrieving song data having note information from a storage medium coupled to the computer system;
   program code for determining from the song data at least two note indicators to be presented sequentially, each note indicator related to corresponding note information;
   program code for determining from the song data a leader between first and second note indicators, the first and second note indicators adjacent to one another, the leader providing information related to the second note indicator, wherein the at least two note indicators are color coded and the leader information includes color determined to match the color code of the second note indicator; and
   program code for displaying the at least two note indicators and the leader between the first and second note indicators.

4. The computer program product of claim 3, wherein the leader includes one or more strands between the first and second note indicators.

5. The computer program product of claim 4, wherein at least one of the one or more strands are displayed as a continuous strand or a series of non-continuous strands.

6. The computer program product of claim 4, wherein the song data includes tempo information, and the leader provides information related to the tempo information using the one or more strands.

7. The computer program product of claim 3, wherein at least one note indicator is related to fret selection on a guitar game controller.

8. The computer program product of claim 3, wherein at least one note indicator is related to pitch in a song.

9. The computer program product of claim 3, wherein the computer readable program code further comprises:
   program code for comparing a user input to at least one note indicator when the at least one note indicator passes a predetermined location; and
   program code for determining a score based on a difference between the user input and the at least one note indicator.

10. The computer program product of claim 9, wherein program code for comparing includes comparing a time the user input was received to an expected time, and program code for determining a score based on a difference includes a time difference between the user input received and the expected time.

11. The computer program product of claim 3, wherein the song data includes note information for two or more different types of musical instruments.

12. The computer program product of claim 3, wherein the computer readable program code further comprises:
   program code for determining from the song data at least one additional note indicator to be presented concurrently with the second note indicator.

13. The computer program product of claim 12, wherein the leader includes two or more strands between the first and second note indicators, one strand provides information related to the second note indicator and another strand provides information related to the at least one additional note indicator.

14. The computer program product of claim 3, wherein the computer readable program code further comprises:

program code for changing an appearance of at least one note indicator over time as the at least one note indicator approaches a predetermined location.

15. A method of providing a music game using a computer system, the method comprising:
retrieving song data having note information from a storage medium coupled to the computer system;
determining from the song data, using the computer system, at least two note indicators to be presented sequentially, each note indicator related to corresponding note information;
determining from the song data, using the computer system, a leader between first and second note indicators, the first and second note indicators adjacent to one another, the leader providing information related to the second note indicator, wherein the at least two note indicators are color coded and the leader information includes color determined to match the color code of the second note indicator; and
causing display of the at least two note indicators and the leader between the first and second note indicators.

16. The method of claim 15, wherein the leader includes one or more strands between the first and second note indicators.

17. The method of claim 16, wherein at least one of the one or more strands are displayed as a continuous strand or a series of non-continuous strands.

18. The method of claim 16, wherein the song data includes tempo information, and the leader provides visual information related to the tempo information using the one or more strands.

19. The method of claim 15, wherein at least one note indicator is related to fret selection on a guitar game controller.

20. The method of claim 15, wherein at least one note indicator is related to pitch in a song.

21. The method of claim 15, further comprising:
comparing a user input to at least one note indicator when the at least one note indicator passes a predetermined location; and
determining a score based on a difference between the user input and the at least one note indicator using the computer system.

22. The method of claim 21, wherein comparing includes comparing a time the user input was received to an expected time, and determining a score based on a difference includes a time difference between the user input received and the expected time.

23. The method of claim 15, wherein song data includes note information for two or more different types of musical instruments.

24. The method of claim 15, further comprising:
determining from the song data, using the computer system, at least one additional note indicator to be presented concurrently with the second note indicator.

25. The method of claim 24, wherein the leader includes two or more strands between the first and second note indicators, one strand provides information related to the second note indicator and another strand provides information related to the at least one additional note indicator.

26. The method of claim 15, further comprising:
changing an appearance of at least one note indicator over time as the at least one note indicator approaches a predetermined location.

27. A music game system comprising:
a song manager module configured to retrieve song data having note information from a storage medium; and
a user interface module, operatively coupled to the song manager module, configured to determine from the song data at least two note indicators to be presented sequentially, each note indicator related to corresponding note information, the user interface module also configured to determine from the song data a leader between first and second note indicators, the first and second note indicators adjacent to one another, the leader providing information related to the second note indicator, wherein the at least two note indicators are color coded and the leader information includes color determined to match the color code of the second note indicator.

28. The music game system of claim 27, further comprising:
a display device that displays the at least two note indicators and the leader between the first and second note indicators.

29. The music game system of claim 27, wherein the leader includes one or more strands between the first and second note indicators.

30. The music game system of claim 29, wherein at least one of the one or more strands are displayed as a continuous strand or a series of non-continuous strands.

31. The music game system of claim 29, wherein the song data includes tempo information, and the leader provides information related to the tempo information using the one or more strands.

32. The music game system of claim 27, wherein at least one note indicator is related to fret selection on a guitar game controller.

33. The music game system of claim 27, wherein at least one note indicator is related to pitch in a song.

34. The music game system of claim 27, further comprising:
a matching module configured to compare a user input to at least one note indicator when the at least one note indicator passes a predetermined location; and
a user performance module, operatively coupled to the matching module, configured to determine a score based on a difference between the user input and the at least one note indicator.

35. The music game system of claim 34, wherein the matching module further compares a time the user input was received to an expected time, and the user performance module further determines the score based on a time difference between the user input received and the expected time.

36. The music game system of claim 27, wherein the song data includes note information for two or more different types of musical instruments.

37. The music game system of claim 27, wherein the user interface module is further configured to determine from the song data at least one additional note indicator to be presented concurrently with the second note indicator.

38. The music game system of claim 37, wherein the leader includes two or more strands between the first and second note indicators, one strand provides information related to the second note indicator and another strand provides information related to the at least one additional note indicator.

* * * * *